United States Patent [19]
Greene et al.

[11] Patent Number: 6,140,815
[45] Date of Patent: Oct. 31, 2000

[54] HIGH STABILITY SPIN STAND PLATFORM

[75] Inventors: Philip M. Greene, Hingham; Stephen L. Hero, Westboro; Michael D. Townsend, Upton, all of Mass.

[73] Assignee: Dover Instrument Corporation, Westboro, Mass.

[21] Appl. No.: 09/099,046

[22] Filed: Jun. 17, 1998

[51] Int. Cl.[7] .................................................. G01R 33/00
[52] U.S. Cl. ............................................ 324/262; 369/53
[58] Field of Search ..................................... 324/210, 211, 324/212, 262, 755, 758; 369/53, 55, 56, 57

[56] References Cited

U.S. PATENT DOCUMENTS 5,127,744  7/1992  White et al. .
5,572,144  11/1996  Davidson et al. ...................... 324/755
5,706,080  1/1998  Pekin et al. .

Primary Examiner—Walter E. Snow
Attorney, Agent, or Firm—Choate, Hall & Stewart

[57] ABSTRACT

Spin stand platform having split axes. The platform includes an air bearing spindle stage supporting a test disk and constrained for motion in a plane on a surface along a first axis. A micropositioning stage air bearing is provided which is constrained for motion in the plane on the surface along a second axis orthogonal to the first axis and the micropositioning stage is adapted to support a read head element under test. First and second acuators move the stages to desired locations. At the desired location, apparatus removes air from the air bearings to lock-down the stages to the surface at the desired locations. It is preferred that the air bearings be vacuum preloaded and that linear motors be used to move the stages.

5 Claims, 4 Drawing Sheets

HIGH STABILITY SPIN STAND PLATFORM

BACKGROUND OF THE INVENTION

This invention relates to a high stability spin stand platform for testing read/write head assemblies used in computer hard disk drives.

Over the past decade, hard disk drive storage capacities have increased dramatically. This increase in storage capacity has resulted, in part, from the rapidly advancing technological developments in the magnetic sensitivity of the read/write head element. This rapid advancement in technology has made the read head very demanding to manufacture and as a result, virtually all of the read heads manufactured, and certainly all advanced technology heads, require acceptance testing.

The electrical characteristics of the read head are qualified on what is known in the industry as an electrical tester. This test device incorporates a motion platform which mimics the motions of the read head in an actual disk drive. The motion platform usually includes a coarse positioning stage and a micropositioning stage. The electrical tester also incorporates sophisticated electronics which test the read head element. Although the electrical qualification of the read head element has always been demanding, the motion requirements of the electrical tester have only recently pushed the limits of available technology.

As stated above, a two stage motion system typically consists of a coarse positioning stage and a micropositioning stage. In a computer disk drive, the data is stored along a spiral track on the disk. The radial spacing between tracks is as dense as 10,000 tracks per inch (tpi), currently, and as dense as 30,000 tpi is planned in the future. In order to qualify the performance of the read head, it is desirable to have the capability to move the head in discrete motion increments which are two orders of magnitude ($10^2$) less than the track spacing. At 10,000 tpi, this is a motion increment of 1 $\mu$inch (25 nanometers). These fine motions are performed by the micropositioning stage which typically includes a piezoelectric crystal which expands and contracts in response to an applied voltage. This device has a very limited range typically on the order of 10 $\mu$m, so that it is necessary to reposition the entire micropositioning stage in order to test the read head at different locations on the disk. Most electrical tester configurations require a full range travel of 100 to 150 mm. In an actual disk drive, the read head traverses from the outer radius to the inner radius of the disk drive along an angular path (the head is mounted to a swing arm, similar to a record player) and thus, the relative angle of the head changes relative to the vector tangent to the servo tracks. This change in angle is termed the skew angle and variations in the skew angle have an effect on the performance of the head. In some electrical testers, however, the head is moved in a cartesian XY plane. It can be shown mathematically that the complete range of skew angles can be recreated by moving the head to various XY positions. This attribute makes these testers very flexible to different disk drive configurations in which the disk diameter and pivot angle of the drive arm vary.

A typical testing sequence for an electrical tester begins with the read head assembly, consisting of read heads mounted to a flexure arm, being mounted into a fixture (often referred to as the "nest") on a micropositioning stage. A spindle for supporting a magnetic disk is accelerated to an operating speed, typically 7,200 to 14,400 rpm. A coarse positioning stage moves the read head to a first test position and the read head is commanded to perform an adjacent track erase, in which all magnetic information on the disk is erased for the test track and for the adjacent inner and outer tracks. The read head is then commanded to write a stream of data to the disk of some finite length, typically less than a full rotation of the disk. The micropositioning stage then moves the head "off-track", usually to the position of what would be the next adjacent track to verify that the magnetic information from the test track cannot be sensed from the adjacent track. The micropositioning stage then moves the head across the test tract in discrete motion increments as small as 25 nm to correlate the intensity of the magnetic data on the test track to the radial position on the disk. In many newer heads in which the read and write heads are not co-located, this test also determines the relative spacing of the read and write elements. The coarse positioning stage is then moved to subsequent test points and the above steps are repeated. At the end of the test, the coarse positioning stage fully retracts to the load position and the read head assembly is exchanged for an untested assembly.

In order to optimize the total cycle time for the test sequence, it is highly desirable for the discrete motion increments of the micropositioning stage to be completed (both move time and time to settle within a stability band such as 10 nm) in less time than is required for a single rotation of the disk (e.g., 0.0043 seconds at 14,400 rpm). This goal is not currently achievable with existing designs.

The principle elements of prior art testers are a high speed air bearing spindle and a two stage motion system (i.e., a coarse positioning stage and a micropositioning stage). Existing tester designs typically utilize XY stacked stages, whether air bearing or mechanical. The stacked stages limit the capability of the micropositioning stage due to the dynamics of the stacked stage design. Even when an individual stage is made to be stiff, the ultimate structural dynamics for each stage are determined by the limitations of the drive actuator of the orthogonal stage axis. Such stages typically use leadscrew drives which have limited stiffness. Even the most rigid stacked stage designs have 1st mode natural frequencies of less than 200 Hz. Thus a single period of oscillation due to an external perturbation will take 0.005 seconds. Therefore, any positional perturbations due to the reaction forces from the micropositioning stage which exceed a stability band of 10 nm in magnitude make it impossible to achieve the goal of a sub-5 millisecond micropositioning move. In actual application, it is desirable for the coarse positioning stage to have a 1st mode natural frequency in excess of 1 kHz.

Due to the continually increasing storage density of disk drives, the testing of read/write heads currently in development will require levels of position stability that is difficult to achieve with current technology. In addition, constant price pressure due to a competitive marketplace is requiring increases in manufacturing throughput. As a result the spin stand platform now needs to move the read head under test more rapidly while at the same time providing a high level of positional stability. The typical stability requirement for the coarse positioning stage is to have no more than ±10 nm of variation in position over a period of several seconds. An additional requirement is that once positioned, the coarse stage must be extremely rigid so that reaction forces from the moving piezo stage and imbalance forces from the rotating spindle induce very little motion (in the form of vibration) in the coarse positioning stage. The relative position of the read head with respect to the spindle must remain stable within the ±10 nm band; thus any motion of the coarse positioning stage will compromise this level of performance.

The spin stand platform of the invention was conceived in order to provide several key advantages over existing spin stand platforms. A primary advantage is in the area of position stability under test. The spin stand platform of the invention can accommodate the stringent requirements resulting from ever denser radial spacing of tracks on computer disk drives.

SUMMARY OF THE INVENTION

In one aspect, the spin stand platform includes an air bearing spindle stage supporting a test disk and constrained for motion in a plane on a surface along a first axis. An air bearing micropositioning stage is constrained for motion in the plane on the surface along a second axis orthogonal to the first axis, the micropositioning stage adapted to support a read head element. A first actuator is provided for moving the spindle stage to a desired location along the first axis and a second actuator is provided for moving the micropositioning stage to a desired location along the second axis. Apparatus is provided for removing air from the spindle stage and the micropositioning stage air bearings to lockdown the spindle stage and the micropositioning stage to the surface at the desired locations. In a preferred embodiment, the air bearings for the spindle stage and the micropositioning stage are vacuum preloaded to hold the stages rigidly in place at the test position. In another embodiment, a quick dump valve is provided to supply air to the air bearings which results in rapid operation.

In another aspect, the air bearings include a large central vacuum region to create high preload force and small vacuum regions proximate the air bearing inlets for rapid removal of air from the bearings.

It is also preferred that the first and second actuators be linear motors.

DESCRIPTION OF THE PREFERRED EMBODIMENT

The improved performance of the spin stand platform of the invention results from separating the axes so that one axis carries the micropositioning stage which supports a read head under test and the other axis carries the air bearing spindle which supports a magnetic disk. During motion, both stages are frictionless air bearing motion axes driven directly by linear motors. However, when the stage reaches the test position, the air is removed from the air bearings and the stages are vacuum preloaded directly into contact with a granite surface providing exceptional rigidity. As will be seen below, techniques are disclosed which allow the air to be purged from the air bearing very rapidly. Also, because the air is removed from both stages, there is not a relative height change between the disk and the head under test. The vacuum locked stages of the invention provide the required stiffness of greater than 1 kHz which traditional stacked stages cannot.

Figure 1:
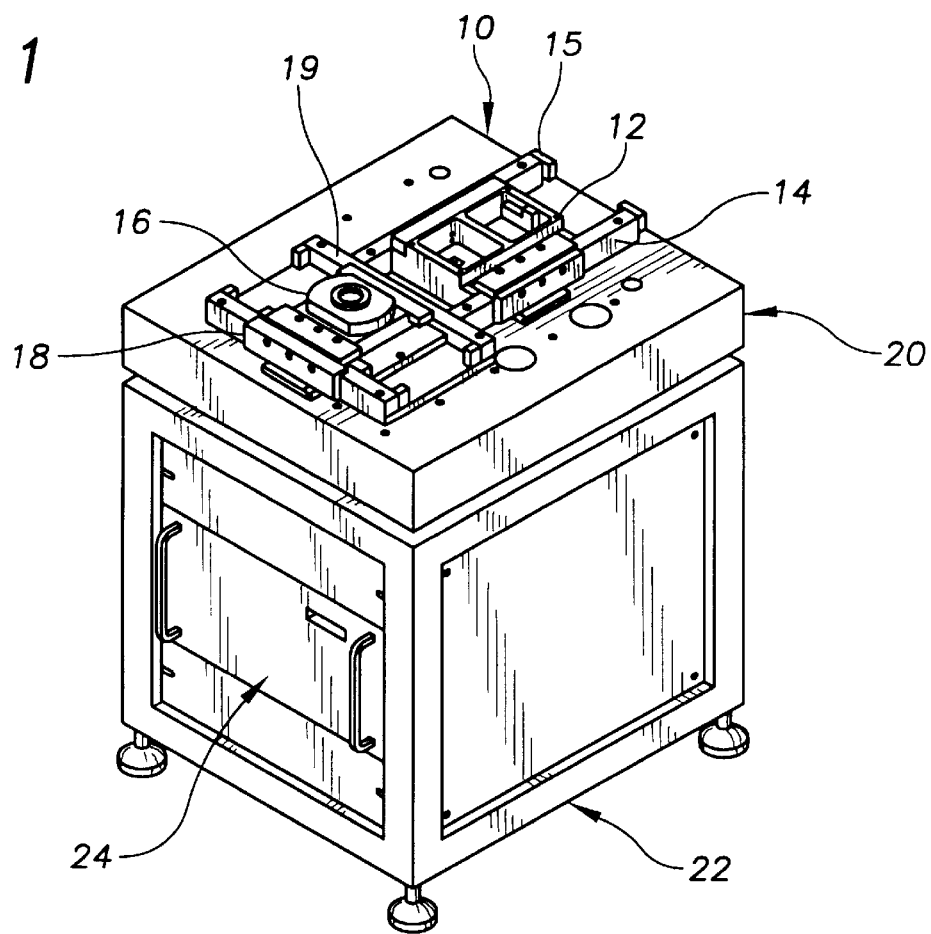
FIG. 1 is a perspective view of the high stability spin stand platform of the invention.

With reference now to FIG. 1 a high stability spin stand platform 10 includes a micropositioning carriage 12. Those skilled in the art will appreciate that the micropositioning carriage 12 includes a micropositioning module (not shown) such as a piezoelectric actuator and a read head under test (not shown) will be carried by the micropositioning module. The micropositioning carriage 12 moves along a single axis under the control of a linear motor 14. An incremental position encoder 15 responds to the position of the carriage 12.

An air bearing spindle carriage 16 supports a magnetic disk (not shown) for rotation. The air bearing spindle carriage 16 moves along an axis perpendicular to the direction of motion of the carriage 12 under the control of a linear motor 18 in response to an incremental position encoder 19. The carriages 12 and 16 ride on a smooth, flat granite base 20. A steel support frame 22 supports the granite base 20, typically through a pneumatic isolation system. The support frame 22 also supports a motion controller 24 and all other electronics and the pneumatic support equipment (not shown). The motion controller 24 contains a motion control card which interfaces with a host computer (not shown) and causes the carriages to move along their respective axes under servo control. The power supply for the motion axes is also housed in the motion controller 24.

The split axis configuration of the invention allows the micropositioning stage 12 and the spindle stage 16 to move in the same plane on the surface of the granite base 20. This configuration results in no net height difference between the disks and the read head under test when the air film is removed. The use of vacuum preloading rigidly holds the stages in place at a test position. Traditional motion axes are not stiff enough to reject the cyclic loading from the rotating imbalance in the spindle and thus cannot be used in this configuration. However, the incorporation of the vacuum lock down technique makes this split axis configuration viable. As will be discussed below, the design of the air/vacuum bearings which use a large central vacuum region to achieve a high preload force and small vacuum regions within the air bearing pads to facilitate the rapid removal of air from the bearings contribute to the high performance of the spin stand platform of the invention.

Figure 2:
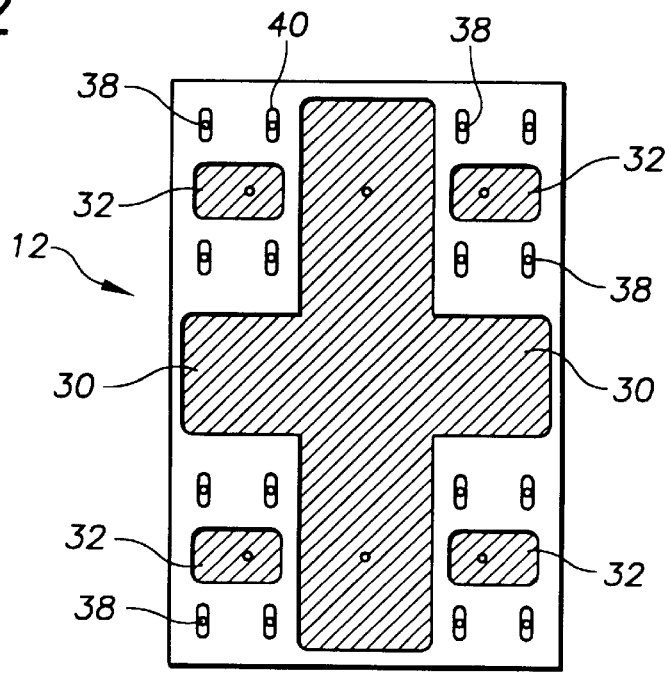
FIG. 2 is a bottom view of a micropositioning stage air bearing.
Figure 3:
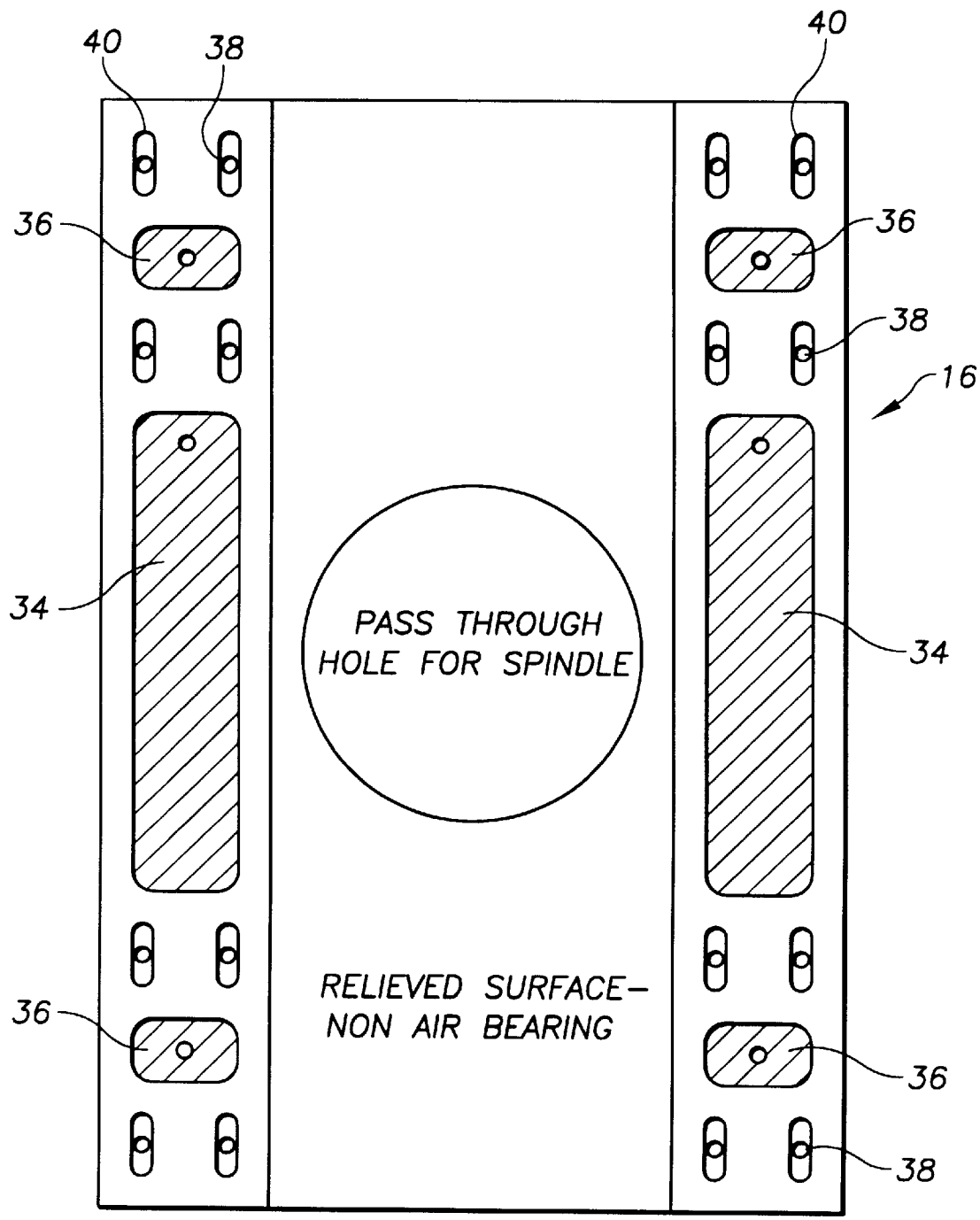
FIG. 3 is a bottom view of a spindle stage air bearing.

FIGS. 2 and 3 show the air bearing surfaces used on the high stability spin stand platform of the invention. As background, an air bearing is formed when pressurized air is introduced into the gap between two flat plates. In order for the air bearing to support a load, there must be a positive pressure in the region between the flat plates. Because air has very low viscosity, the gap between the two plates needs to be very small in order for the surface friction between the plates and the air to restrict the flow of the air, thus creating a pressure differential. Typically, the gap is on the order of 5 to 10 $\mu$m. This very small gap also requires that the plates be flat on the order of 2 $\mu$m, making the air bearings difficult to manufacture.

The pressurized air in the gap between the plates has a natural tendency to expand resulting in an increased gap. As the air expands, the air film pressure is reduced which reduces stiffness of the air film. Because a stiff air film is desirable, the gap must be reduced. This reduction is accomplished by introducing a force opposite to the film pressure. This mode of operation is referred to as "preloading" the air film. Preloading can be accomplished by using an opposing air bearing, by weight (gravity), by magnetic force or, in the present case, by drawing a vacuum.

In FIGS. 2 and 3 vacuum regions are shown as shaded areas. The micropositioning air bearing 12 shown in FIG. 2 includes a large central vacuum region 30 and smaller vacuum regions 32. The vacuum regions 30 and 32 are recessed surfaces which are parallel to the main air bearing surface. Air is evacuated from these regions to create a negative pressure which applies the preload force. The spindle air bearing 16 of FIG. 3 similarly includes vacuum regions 34 and 36. The bearings also include orifices 38 through which pressurized air is introduced into the air bearing. Surrounding these orifices 38 are oval shaped regions 40 which are slightly recessed, on the order of 12 μm from the air bearing surface. These regions 40 function to stabilize the pressure in the bearing and to evenly distribute the supply air.

What differs in this air bearing design from conventional air bearing designs is that in addition to the large central vacuum regions 30 and 34, the small regions 32 and 36 are included between the inlet orifices 38. In addition to preloading the air bearing, these regions also help to evacuate the air film when the supply air pressure is turned off. This configuration facilitates the rapid "lock down" of the bearing of the invention. Without these regions 32 and 36, the air film would have to be "squeezed" out from between the plates. The addition of these regions significantly reduces the time for the system to achieve full stability after the lock down is applied.

Figure 4:
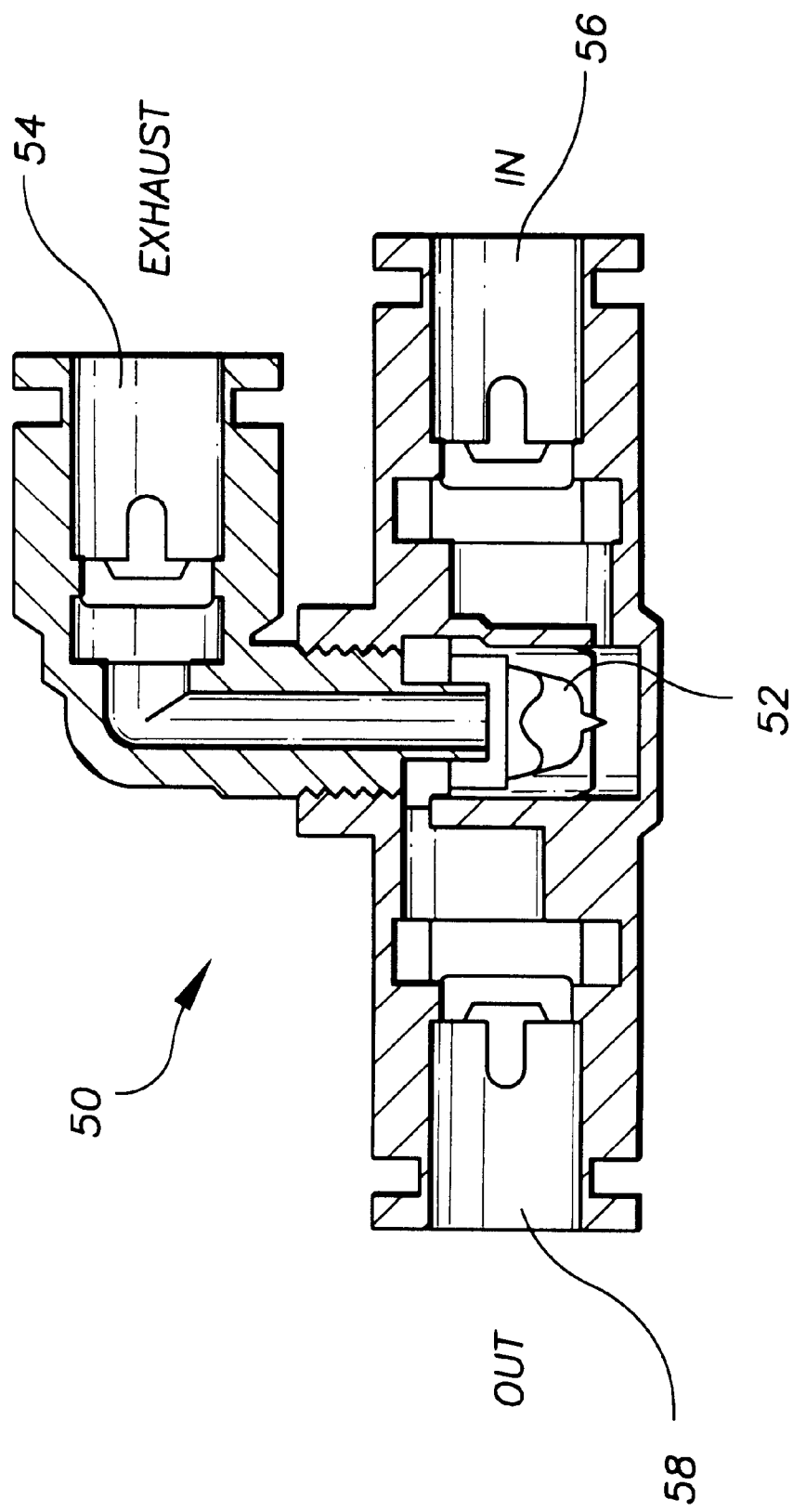
FIG. 4 is a cross-sectional view of a quick dump valve for use in the invention.

It is preferred that a pneumatic "quick dump" valve 50 as shown in FIG. 4 be used to supply air to the air bearing carriages 12 and 16. Supply air is turned on and off electronically using a solenoid controlled air valve (not shown). In order to overcome the restricted flow of a solenoid valve, the quick dump valve 50 is used at the air inlet to the carriage. The quick dump valve 50 employs a moveable rubber seal 52. The moveable rubber seal 52 opens and closes a large, free flowing exhaust port 54 in the valve. As long as the supply pressure at an inlet 56 is higher than the pressure in the bearing (and in an outlet port 58), the exhaust port 54 is closed. As soon as the supply pressure drops (when the solenoid valve is switched off) the rubber seal 52 opens the exhaust port 54 allowing the pressure in the air bearing to drop rapidly. The quick dump valve 50 thus allows the solenoid valve to be remotely located. Air is exhausted much more quickly than if air traveled through an air hose and exhausted through the solenoid because of pneumatic restrictions. A suitable quick dump valve 50 is available from SMC Pneumatics, Inc. of Tokyo, Japan.

The system of the inventions provides frictionless motion with no moving parts, no wear and no required maintenance in the form of lubrication or periodic replacement of components. This is a major advantage over motion stages which use leadscrews and rolling element bearings which require both lubrication and periodic replacement.

Figure 5:
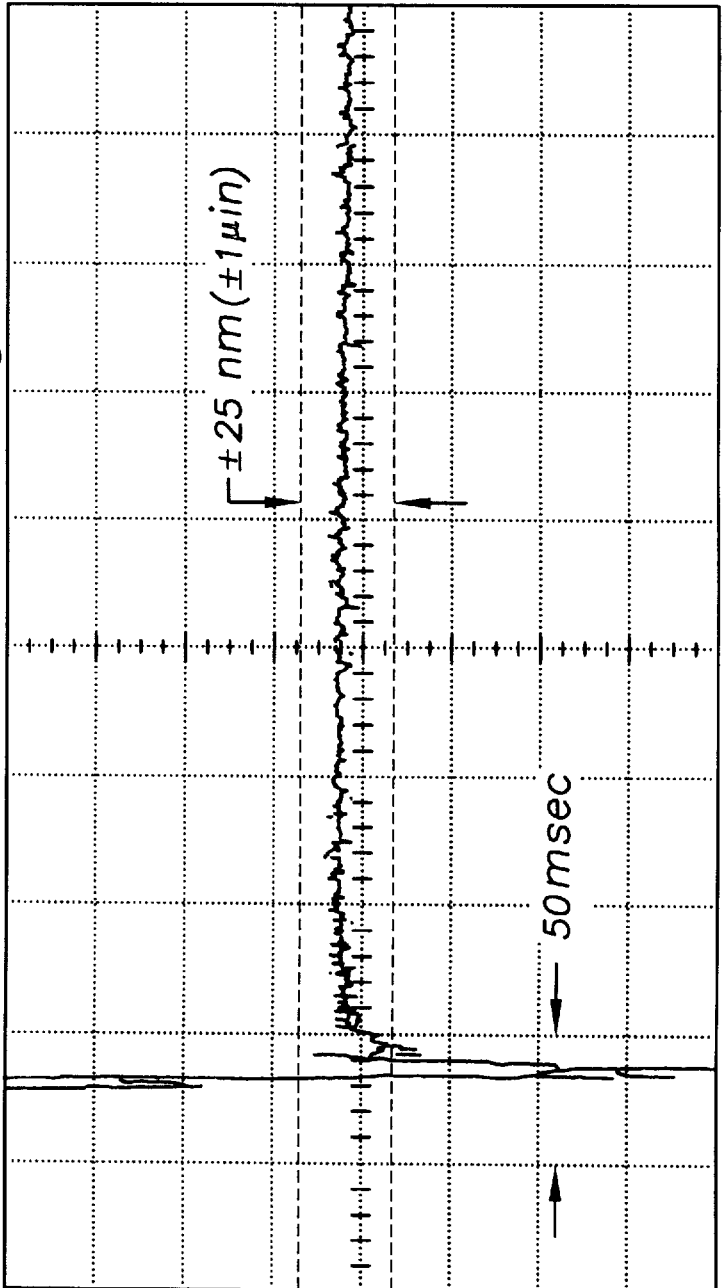
FIG. 5 is a graph showing position settling for the vacuum locked air bearing stage.

In operation, the motion controller 24 controls the linear motors 14 and 18 to move the carriages 12 and 16 to desired locations monitored by position encoders 15 and 19. Upon arrival at a desired location, air is rapidly removed from the air bearing through the quick dump valve 50 which locks the carriages 12 and 16 to the granite base 20. At this time, fine position adjustments are made by a micropositioning module carried on the micropositioning carriage 12. FIG. 5 shows a typical settling performance of the split stage design of the present invention. In this example, the stage reaches a stability level of ±10 nm within 50 msec of the move completion. Although this performance is exceptional, it is even more dramatic in that the linear motor driven stages 12 and 16 offer faster move velocities than leadscrew stages of the prior art that they replace. The data shown in FIG. 5 was taken with stages 12 and 16 moving at a peak speed of 350 mm per second and with an acceleration rate of 0.2 g. With these move parameters, a full travel 100 mm move and settle (including brake release, move and brake reengagement) take 600 msec as opposed to 1.0 to 1.5 seconds for a leadscrew stages in the prior art. It is thus seen that the high stability spin stand platform of this invention provides the capability of both increased positional stability and higher throughput demanded by the marketplace.

It is recognized that modifications and variations of the invention disclosed herein will be apparent to those skilled in the art. It is intended that all such modifications and variations be included within the scope of the appended claims.

What is claimed is:

1. Spin stand platform comprising:
   an air bearing spindle stage supporting a test disk and constrained for motion in a plane on a surface along a first axis;
   an air bearing micropositioning stage constrained for motion in the plane and on the surface along a second axis orthogonal to the first axis, the micropositioning stage adapted to support a read head element;
   a first actuator for moving the spindle stage to a desired location along the first axis;
   a second actuator for moving the micropositioning stage to a desired location along the second axis; and
   apparatus for removing air from the spindle stage and the micropositioning stage air bearings to lock-down the spindle stage and the micropositioning stage to the surface at the desired locations.

2. The spin stand platform of claim 1 wherein the air bearings for the spindle stage and the micropositioning stage are vacuum preloaded.

3. The spin stand platform of claim 2 further including a quick dump valve to supply air to the air bearings.

4. The spin stand platform of claim 2 wherein the air bearings include a large central vacuum region to create high preload force and small vacuum regions proximate air bearing inlets for rapid removal of air from the bearings.

5. The spin stand platform of claim 1 wherein the first and second actuators are linear motors.

* * * * *